United States Patent [19]
Schober et al.

[11] Patent Number: 5,955,984
[45] Date of Patent: Sep. 21, 1999

[54] SYSTEM AND METHOD FOR SIMULTANEOUS DATA LINK WITH MULTIPURPOSE RADAR OPERATIONS

[75] Inventors: Michael B. Schober, Tuscon; Donald M. Targoff, Oro Valley, both of Ariz.

[73] Assignee: Raytheon Company, Lexington, Mass.

[21] Appl. No.: 08/984,102

[22] Filed: Dec. 3, 1997

[51] Int. Cl.[6] ....................................... G01S 7/285
[52] U.S. Cl. ............................ 342/159; 342/198; 342/59
[58] Field of Search ........................... 342/59, 198, 159, 342/19

[56] References Cited

U.S. PATENT DOCUMENTS

| | | | |
|---|---|---|---|
| 3,394,372 | 7/1968 | Schrader | 342/175 |
| 3,731,310 | 5/1973 | Rittenbach | 342/59 |
| 3,911,432 | 10/1975 | Williams | 342/59 |
| 4,010,468 | 3/1977 | Fishbein et al. | 342/59 |
| 4,584,578 | 4/1986 | Brauns et al. | 342/59 |
| 4,613,862 | 9/1986 | O'Donnell | 342/59 |
| 4,827,263 | 5/1989 | Jones et al. | 342/59 |
| 4,866,447 | 9/1989 | Loucks | 342/58 |

*Primary Examiner*—John B. Sotomayor
*Attorney, Agent, or Firm*—David W. Collins; Andrew J. Rudd; Glenn H. Lenzen, Jr.

[57] ABSTRACT

A technique for operating a communication link in RF proximity to an operational radar. A data link waveform is employed which allows a data link receiver to detect an alert indication during normal radar operation. When the alert is detected, the system briefly inhibits radar operation to receive the information content of the data link message. A data link message rate is selected to keep the impact to radar operation at a minimum.

17 Claims, 3 Drawing Sheets

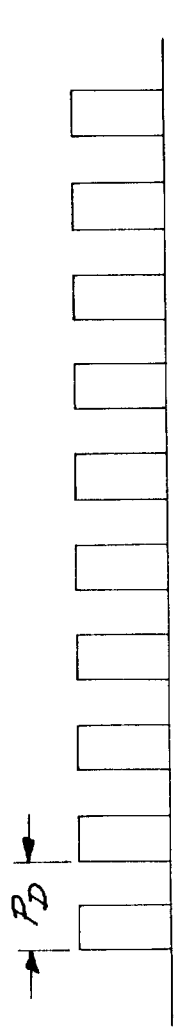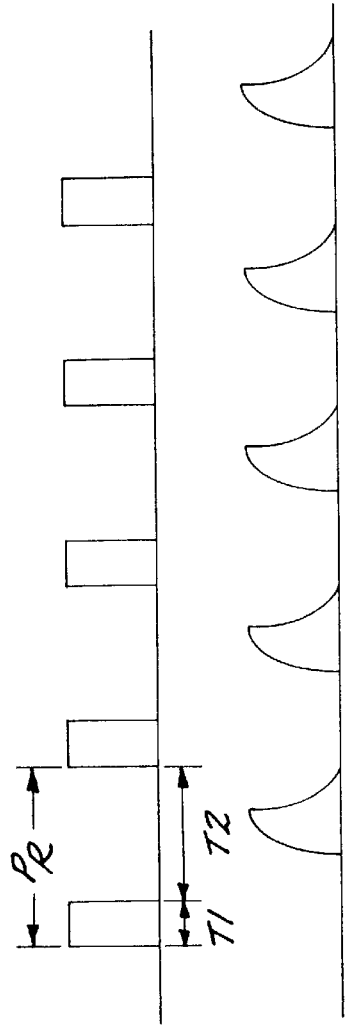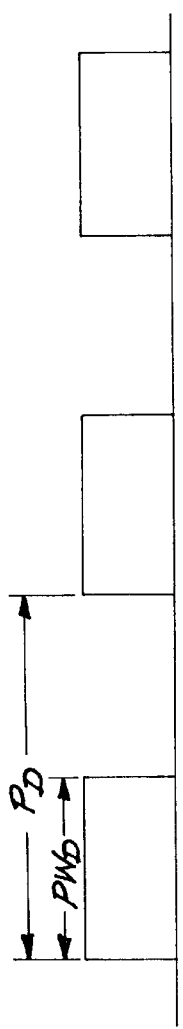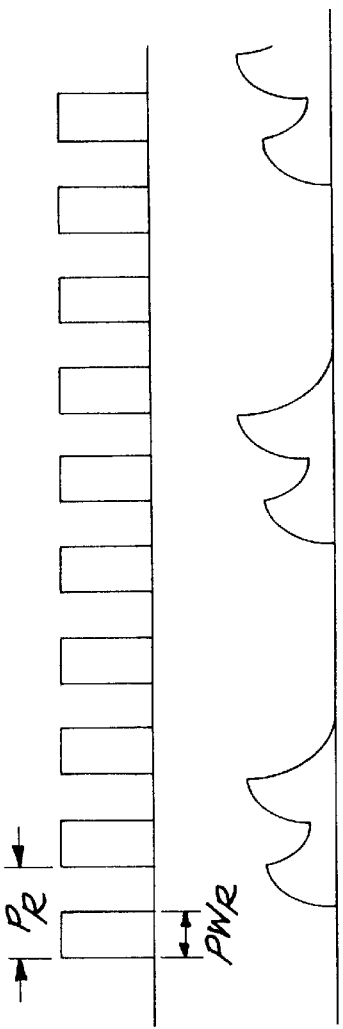
FIG.3A  FIG.3B  FIG.3C  FIG.4A  FIG.4B  FIG.4C

5,955,984

SYSTEM AND METHOD FOR SIMULTANEOUS DATA LINK WITH MULTIPURPOSE RADAR OPERATIONS

TECHNICAL FIELD OF THE INVENTION

The present invention relates to radar systems, and more particularly to techniques to operate a communication link in RF proximity to an operational radar.

BACKGROUND OF THE INVENTION

The purpose of this invention is to provide a method for simultaneous data link and radar operation in RF proximity. Conventionally, significant RF separation is used to minimize interference between a platform's multifunction radar (which must operate almost continually) and the platform's data link. Other techniques for minimizing interference involve using a designated time slot that essentially time multiplexes the use of the radar and data link receivers, never operating the two simultaneously. Time based techniques require the approximate time-of-arrival of each data link message to be known a priori.

Thus, traditional methods for simultaneous operation of an active radar and a data link are exclusively tied to pre-selected frequency or time separation.

SUMMARY OF THE INVENTION

This invention provides a technique to operate a communication link in RF proximity to an operational radar. A data link waveform is employed which allows the data link receiver to detect an alert indication during normal radar operation. When the alert is detected, radar operation is briefly inhibited while the information content of the data link message is received. A data link message rate is selected to minimize the impact on radar operation.

One aspect of the invention is that the data link and radar operate in the same RF band, thereby conserving RF bandwidth usage requirements. Use of the same bandwidth also allows for the common use of certain receiver components, such as the frequency synthesizer. According to another aspect of the invention, data link messages can be received asynchronously, simplifying the burden on the data link transmitter. This ability to minimize the impact of data link reception on radar operation provides a ready "add-on" capability to an existing radar system. Further, the use of a common bandwidth of operation of the data link and operational radar can lead to use of the existing radar transmitter for use as a data link transmitter. Thus, adding a data link receiver to an operational radar in accordance with an aspect of this invention can provide a complete two-way communication link.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 3A–3C illustrate respective data link transmit waveforms, blanking signals and resultant waveforms to demodulate in an exemplary MPRF system in accordance with the invention.

FIGS. 4A–4C illustrate respective data link transmit waveform, blanking signal and resultant waveform to demodulate for an HPRF radar.

DETAILED DESCRIPTION OF THE PREFERRED EMBODIMENT

An exemplary embodiment of a system in accordance with the invention employs several elements commonly found in radar and communication systems. For example, in a pulsed radar system, conventional techniques are employed to filter, demodulate, and detect incoming data link pulses, to blank a receiver, and to blank/inhibit a transmitter. All of these techniques are common practice in current state of the art receivers, and need not be described in detail herein.

Figure 1:
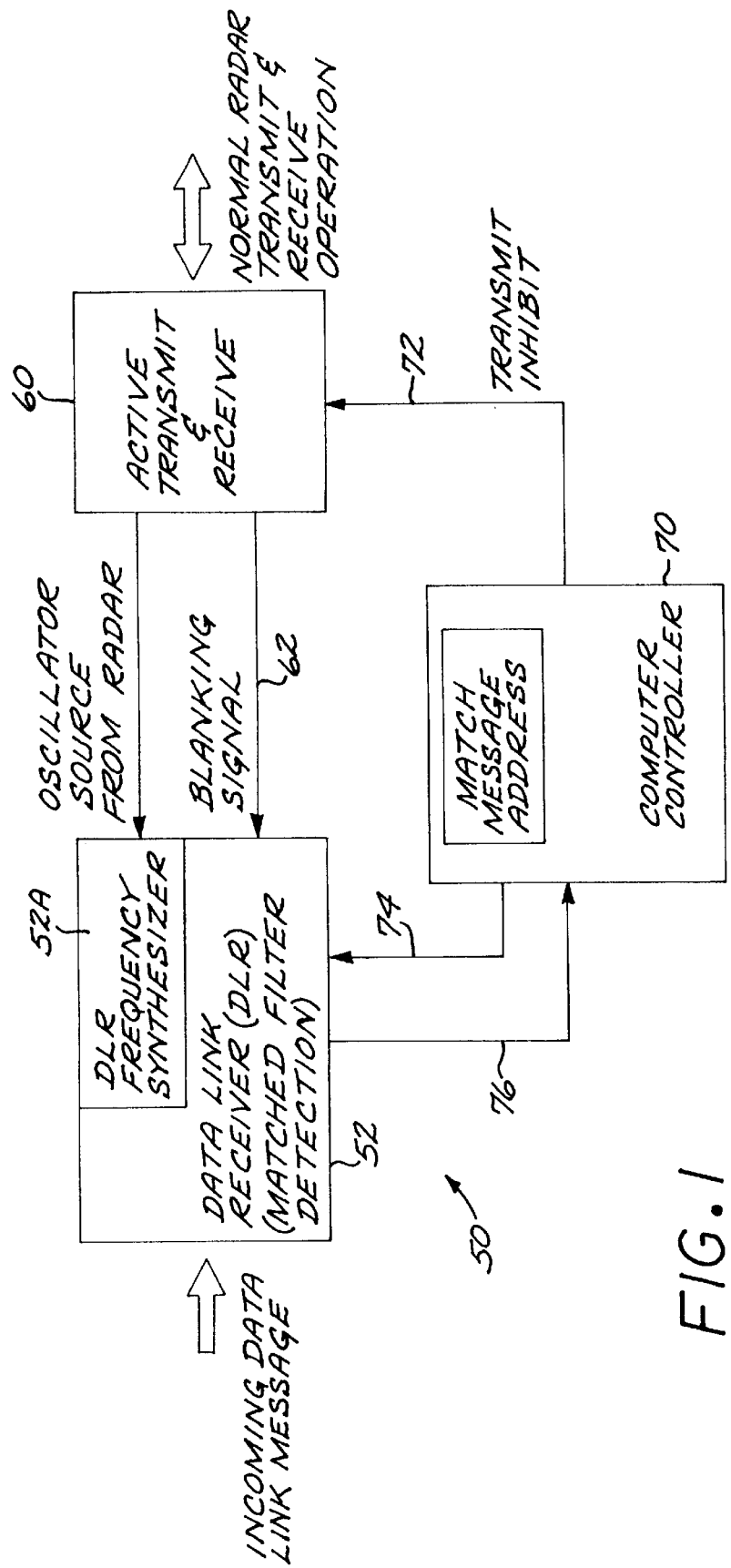
FIG. 1 is a simplified block diagram of a system embodying the invention, to permit simultaneous data link and radar operations within the same RF band.

The main elements of an exemplary embodiment of a system 50 embodying the subject invention are shown in the simplified block diagram of FIG. 1. These include a data link receiver (DLR) 52, an active radar system 60, a computer controller 70, a blanking signal 62 originating in the radar system, and a transmit inhibit signal 72 originating in the computer controller. The conventional function of the blanking signal 62 in an active radar system is to "blank" the radar receiver while the radar is transmitting.

One aspect of the invention is that the data link and radar operate in the same RF band, thereby conserving RF bandwidth usage requirements. Use of the same bandwidth also allows for the common use of certain receiver components, such as the frequency synthesizer. The DLR 52 in this exemplary embodiment performs matched filter detection on the received data link signals, and passes demodulated data link signals over data line 76 to the controller 70. The controller 70 sends control signals over control line 74 to the DLR to control various functions of the DLR, including control signals to tune the DLR to the appropriate frequency to receive the data link signals. The controller 70 controls various functions of the DLR by the control signals passed over line 74.

Normal operation of the system 50 begins with it listening for an incoming data link message during time intervals in which the radar is not transmitting, i.e. while a blanking signal is not being sent from the radar system. When "on," the blanking signal will prevent all received energy from entering the receiver 52. Only when the blanking signal is "off" is the receiver 52 able to detect any data link waveforms. When a data link message is received and identified as being addressed to this particular receiver 52, the computer controller 70 will inhibit the radar system 60 from transmitting, thereby maximizing DLR performance. The data link messages can include address information, e.g. in a message header, specifying a particular radar/data link receiver, and a data information portion or block. During this mode of operation, i.e. while the radar system is inhibited from transmitting, a blanking signal is not sent to the DLR.

Various forms of signaling in the data link message are possible in accordance with the subject invention, such as Pulse-Position Modulation (PPM), Phase-Shift Keying (PSK), and Frequency Shift Keying (FSK). The duration of the transmit inhibit signal 72 is a function of the data rate and message duration. A suitable design can minimize the impact to the radar system's operation.

Although the exemplary embodiment of FIG. 1 inhibits radar transmissions for the information portion of the data link message, such inhibition is an optional feature. The invention is equally applicable to a system which always operates with a blanking signal to the DLR, and the active radar transmitter is not inhibited by the operation of the DLR. In such a system, the DLR will receive blanking signals periodically, while the radar transmitter is transmitting, and can therefor not receive data link signals during the blanked time intervals. For such an embodiment an error correcting code could be used to recover those data link signals lost due to the blanking signal.

Another aspect of the subject invention is DLR operation while the radar system 60 is sending its blanking signal 62. This signal is functionally the same one used by the radar system's receiver to protect it from the powerful transmitter pulses. It is used by both receivers, i.e. the radar receiver and the DLR, to achieve maximum sensitivity despite the nearby presence of a powerful transmitter. In what is contrary to state of the art communication systems, the DLR of the subject invention attempts to "see through" the blanking to detect data link waveforms. This is possible with a suitable design of the data link waveform and the particular demodulation technique used in the DLR. Although the particular embodiments presented here can employ, for example, a Medium Pulse Repetition Frequency (MPRF), various waveform/DLR combinations can be easily employed based upon various types of radar receivers. MPRF will typically be in the range of 5 KHz to 75 KHz. High Pulse Repetition Frequency (HPRF) will typically be in the range of 100 KHz and above.

Figure 2:
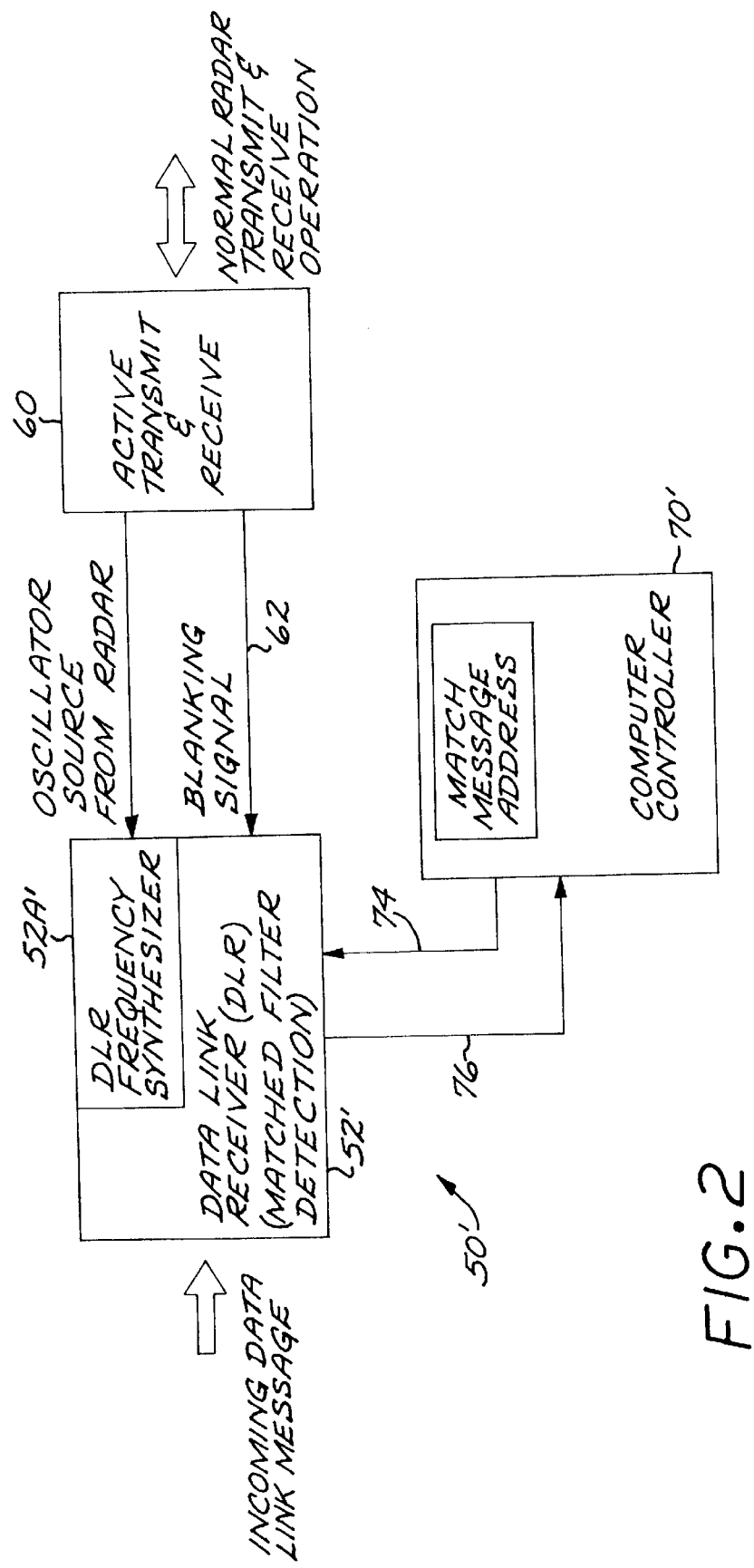
FIG. 2 is a simplified block diagram of an alternate embodiment of a system in accordance with the invention.

FIG. 2 illustrates an alternate embodiment of a system 50' embodying aspects of this invention. As in the embodiment of FIG. 1, this system includes an active radar 60, which generates the blanking signal 62 and includes an oscillator which can be shared with the DLR 52'. In this embodiment, however, the controller 70' does not issue an inhibit signal to inhibit operation of the transmitter comprising the active radar 60 upon receipt of an incoming data link message; the active radar operates in the conventional manner without such inhibition. By appropriate choice of the radar and DLR waveforms, the system is still able to receive DLR messages, even though the DLR 52' is blanked by the blanking signal 62 when the radar transmitter is operating. (Exemplary waveforms suitable for the purpose are illustrated in FIGS. 3A–3B and 4A–4B.)

Suppose that the primary waveform of the radar system for a particular design in accordance with the subject invention is a MPRF pulse train. A simple embodiment of the subject invention can use a MPRF pulse train as the data link transmit waveform with the additional stipulation that its PRF would be twice the maximum PRF of the radar. It is thereby guaranteed that at least 50% of all data link pulses would be detected by the DLR. In practice, since PRFs vary considerably during radar operation, and blanking of received pulses is almost never perfect, the number on average of the effective received pulse rate is much higher. This implies that for a particular system, a trade study can be performed to ascertain the exact PRF of the data link.

FIGS. 3A–3C exemplary MPRF system waveforms. FIG. 3A illustrates an exemplary data link transmit waveform, with a given PRF and waveform period $P_D$. FIG. 3B illustrates an exemplary radar system blanking signal, with a period PRf which is active during a first portion T1 of the period when the transmitter is transmitting RF energy, and is inactive during the remaining portion T2 of the period; the resulting blanking signal has a characteristic PRF which is one half that of the data link transmit waveform of FIG. 3A. FIG. 3C shows an exemplary data link received waveform resulting from matched filter detection at the DLR 52.

If the radar in question has as its primary waveform a HPRF form of modulation, then an MPRF data link pulse train can still be utilized in accordance with the invention. In this case, the pulse width of the data link transmit waveform is selected to enable the DLR to maintain its performance, instead of a higher MPRF. Using a filter matched to the pulse width, the DLR is able to "see" the presence of data link pulses despite the blanking signal. On average a loss of 1–2 dB can be expected due to blanking.

The use of a MPRF data link pulse train with a HPRF radar waveform is illustrated in FIGS. 4A–4C. FIG. 4A shows the data link transmit waveform, with a relatively wide pulse width $PW_D$ and a period $P_D$. FIG. 4B shows the HPRF blanking signal of the radar system 60 with a period PR and an active portion of pulse width $PW_R$. The pulse width PWD of the data link transmit waveform, for this example, is equal to two periods ($P_R$) of the blanking signal waveform. FIG. 4C depicts the data link waveform detected by the DLR 52 after the matched filtering. It should be noted that for an actual system a trade exists between bandwidth and pulse width given a certain blanking waveform. A multifunctional radar with several different waveforms can make the design more complicated, but the invention can still be implemented with a receiver which can detect data link transmissions in the presence of a blanking signal.

The invention confers several advantages that flow naturally from its key elements. A system and method in accordance with this invention can be added to an existing suite of capabilities on a radar platform. Bandwidth usage is conserved by using the blanking signal to operate in RF proximity to an existing radar. Although a data link system in accordance with the invention can be required to use only designated time slots for its operation, its ability to operate independent of the host radar provides the capability to operate with random message arrival times. The use of the same RF frequency region as the radar in accordance with the invention allows the use of the beginning stages of the same frequency synthesizer used by the radar. This is schematically illustrated in FIG. 1, where the DLR frequency synthesizer 52A receives an oscillator reference signal 64 from the radar 60. Furthermore, the ability to operate with the blanking signal implies that data link operation will not impact radar operation except possibly during reception of the message portion of the data link signal. As noted above, the transmit inhibit is an optional feature subject to the various trade-offs between radar and data link performance. Finally, the common RF band implies that for certain radars, the radar itself can be used as the transmit element for complete two-way data communication system.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An active radar system with a data link, comprising:
   an active radar including a radar transmitter and a radar receiver, said radar generating a receiver blanking signal to blank operation of said radar receiver and prevent reception of RF energy during periods of time that said transmitter is actively transmitting RF energy;
   a data link receiver for receiving data link RF signals, said blanking signal being passed to said data link receiver, said data link receiver responsive to said blanking signal to prevent reception of RF energy by said data link receiver;

a controller connected to the radar and to the data link receiver, said controller responsive to messages asynchronously received by said data link receiver indicative of an incoming data link message to generate said transmit inhibit signal, whereby said radar transmitter is inhibited from transmission of RF energy while a data link message is being received.

2. The system of claim 1 wherein said radar transmitter is adapted to transmit RF energy in an RF frequency band of operation, and said data link signals are at RF frequencies within said RF frequency band of operation, wherein said data link and said active radar share an RF frequency band.

3. The system of claim 2 wherein said active radar includes an oscillator source for generating a reference oscillator signal employed by said active radar, said data link receiver includes a frequency synthesizer, and said reference oscillator signal is connected to said frequency synthesizer of said data link receiver, wherein said frequency synthesizer and said active radar share said reference oscillator signal.

4. The system of claim 1 wherein said radar is a pulsed radar operating with a pulse waveform having a radar pulse repetition frequency (PRF), said data link RF signals have a pulse data link waveform at a data link PRF, and wherein said data link PRF is twice said radar PRF.

5. The system of claim 4 wherein said radar PRF is a medium PRF in the range of 5 KHz to 75 KHz, and said data link PRF is a medium PRF in said range.

6. A method for simultaneous active radar and data operations, comprising a sequence of the following steps:
   providing an active radar including a radar transmitter and a radar receiver, and generating a receiver blanking signal to blank operation of said radar receiver and prevent reception of RF energy during periods of time that said transmitter is actively transmitting RF energy, said transmitter responsive to a transmit inhibit signal to inhibit active transmitter operation while said transmit inhibit signal is active;
   providing a data link receiver for receiving data link RF signals;
   inhibiting the data link receiver from reception of RF energy while the blanking signal is active;
   monitoring signals received by the data link receiver to asynchronously determine when data link signals addressed to said data link receiver are received, and generating a transmit inhibit signal in response to messages received by said data link receiver indicative of an incoming data link message, whereby said radar transmitter is inhibited from transmission of RF energy while a data link message is being received.

7. The method of claim 6 wherein said radar transmitter is adapted to transmit RF energy in an RF frequency band of operation, and said data link signals are at RF frequencies within said RF frequency band of operation, wherein said data link and said active radar share a common RF frequency band.

8. The method of claim 6 wherein said radar is a pulsed radar operating with a pulse waveform having a radar pulse repetition frequency (PRF), said data link RF signals have a pulse data link waveform at a data link PRF, and wherein said link PRF is twice said radar PRF.

9. The method of claim 8 wherein said radar PRF is a medium PRF in the range of 5 KHz to 75 KHz, and said data link PRF is a medium PRF in said range.

10. An active radar system with a data link, comprising:
   an active radar including a pulse radar transmitter operating with a primary waveform at a pulse repetition frequency (PRF), said radar transmitter adapted to transmit RF energy in an RF frequency band of operation, with a waveform period, wherein the radar actively transmits during a first portion of the period and does not transmit RF energy during a second portion of the period, said RF energy within a given RF frequency band, the radar further including a radar receiver, said radar generating a receiver blanking signal to blank operation of said radar receiver and prevent reception of RF energy during said first portion of each period of time when said transmitter is actively transmitting RF energy;
   a data link receiver for receiving data link RF signals, said data link signals at RF frequencies within said RF frequency band of operation, said blanking signal being passed to said data link receiver, said data link receiver responsive to said blanking signal to prevent reception of RF energy by said data link receiver during active radar transmissions, and wherein said data link RF signals have a data link PRF at least twice the maximum PRF of the radar transmit signal, wherein at least 50% of all data link pulses are received during time intervals in which the data link receiver is not blanked by said blanking signal.

11. The system of claim 10 wherein said active radar includes an oscillator source for generating a reference oscillator signal employed by said active radar, said data link receiver includes a frequency synthesizer, and said reference oscillator signal is connected to said frequency synthesizer of said data link receiver, wherein said frequency synthesizer and said active radar share said reference oscillator signal.

12. The system of claim 10 wherein said radar PRF is a medium PRF in the range of about 5 KHz to about 75 KHz, and said data link PRF is a medium PRF in said range.

13. An active radar system with a data link, comprising:
   an active radar including a pulse radar transmitter operating with a primary waveform at a high pulse repetition frequency (PRF), said radar transmitter adapted to transmit RF energy in an RF frequency band of operation, with a waveform period, wherein the radar actively transmits during a first portion of the period and does not transmit RF energy during a second portion of the period, said RF energy within a given RF frequency band, the radar further including a radar receiver, said radar generating a receiver blanking signal to blank operation of said radar receiver and prevent reception of RF energy during said first portion of each period of time when said transmitter is actively transmitting RF energy;
   a data link receiver for receiving data link RF signals, said data link signals at RF frequencies within said RF frequency band of operation, said blanking signal being passed to said data link receiver, said data link receiver responsive to said blanking signal to prevent reception of RF energy by said data link receiver during active radar transmissions, and wherein said data link RF signals have a data link medium pulse repetition frequency (MPRF), and wherein a duration of an active portion of a period of the data link signals equals or exceeds two periods of said HPRF.

14. The system of claim 13 wherein said active radar includes an oscillator source for generating a reference oscillator signal employed by said active radar, said data link receiver includes a frequency synthesizer, and said reference oscillator signal is connected to said frequency synthesizer of said data link receiver, wherein said frequency synthesizer and said active radar share said reference oscillator signal.

15. The system of claim 13 wherein said radar HPRF equals or exceeds 100 KHz, and said data link MPRF is in the range of 5 KHz to 75 KHz.

16. An active radar system with a data link, comprising:

an active radar including a radar transmitter and a radar receiver, said radar generating a receiver blanking signal to blank operation of said radar receiver and prevent reception of RF energy during periods of time that said transmitter is actively transmitting RF energy, said radar a pulsed radar operating with a pulse waveform having a high radar pulse repetition frequency (PRF);

a data link receiver for receiving data link RF signals, said blanking signal being passed to said data link receiver, said data link receiver responsive to said blanking signal to prevent reception of RF energy by said data link receiver, said data link RF signals having a pulse data link waveform at a data link PRF, and a wide pulse width longer than a period of said HPRF;

a controller connected to the radar and to the data link receiver, said controller responsive to messages received by said data link receiver indicative of an incoming data link message to generate said transmit inhibit signal, whereby said radar transmitter is inhibited from transmission of RF energy while a data link message is being received.

17. A method for simultaneous active radar and data operations, comprising a sequence of the following steps:

providing an active radar including a radar transmitter and a radar receiver, and generating a receiver blanking signal to blank operation of said radar receiver and prevent reception of RF energy during periods of time that said transmitter is actively transmitting RF energy, said transmitter responsive to a transmit inhibit signal to inhibit active transmitter operation while said transmit inhibit signal is active, said radar a pulsed radar operating with a pulse waveform having a high radar pulse repetition frequency (HPRF);

providing a data link receiver for receiving data link RF signals having a pulse data link waveform at a data link PRF, and a wide pulse width which is longer than a period of said HPRF;

inhibiting the data link receiver from reception of RF energy while the blanking signal is active;

monitoring signals received by the data link receiver to determine when data link signals addressed to said data link receiver are received, and generating a transmit inhibit signal in response to messages received by said data link receiver indicative of an incoming data link message, whereby said radar transmitter is inhibited from transmission of RF energy while a data link message is being received.

* * * * *